(12) United States Patent
Waggle

(10) Patent No.: US 6,769,844 B2
(45) Date of Patent: Aug. 3, 2004

(54) CUTTING INSERT AND METHOD OF MAKING THE SAME

(75) Inventor: James M. Waggle, Derry, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/757,996

(22) Filed: Jan. 10, 2001

(65) Prior Publication Data

US 2002/0090272 A1 Jul. 11, 2002

(51) Int. Cl.[7] .......................... B23B 27/22; B23P 15/28
(52) U.S. Cl. ................................. 407/114; 407/116
(58) Field of Search .................. 407/113, 114, 407/115, 116, 117, 118, 119

(56) References Cited

U.S. PATENT DOCUMENTS

| | | | |
|---|---|---|---|
| 4,685,844 A | * | 8/1987 | McCreery et al. .......... 407/114 |
| 5,158,401 A | * | 10/1992 | Pawlik ........................ 407/40 |
| 5,256,009 A | | 10/1993 | Stoffels ...................... 407/42 |
| 5,382,118 A | | 1/1995 | Satran et al. ................. 407/42 |
| 5,525,016 A | * | 6/1996 | Paya et al. ................... 407/116 |
| 5,688,083 A | | 11/1997 | Boianjiu ..................... 408/224 |
| 5,839,856 A | * | 11/1998 | Hintze et al. ................ 407/114 |
| 5,971,672 A | | 10/1999 | Hansson ...................... 407/114 |
| 6,050,752 A | * | 4/2000 | DeRoche ..................... 407/114 |
| 6,053,672 A | | 4/2000 | Satran et al. ................. 407/40 |
| 6,079,912 A | | 6/2000 | Rothballer ................... 407/114 |
| 6,142,716 A | | 11/2000 | Jordberg et al. ............. 407/114 |
| 6,171,031 B1 | * | 1/2001 | LaFlamme ................... 407/113 |
| 6,234,726 B1 | * | 5/2001 | Okada et al. ................ 407/114 |
| 6,244,791 B1 | * | 6/2001 | Wiman et al. ............... 407/114 |

* cited by examiner

Primary Examiner—Henry W. H. Tsai
(74) Attorney, Agent, or Firm—Larry R. Meenan

(57) ABSTRACT

A cutting insert comprises a rake face, a plurality of flank faces including clearance faces having a positive clearance angle. A cutting edge is formed at an intersection between the rake faces and the flank face and a convex wiper cutting edge formed on the cutting edge. A method for forming the cutting insert comprises the steps of placing a powdered material into a die and pressing the powdered material in the die to achieve a form having a convex portion on the rake face and at least one substantially flat clearance face having a positive clearance angle. Next, the form is removed from the die and sintered.

13 Claims, 16 Drawing Sheets

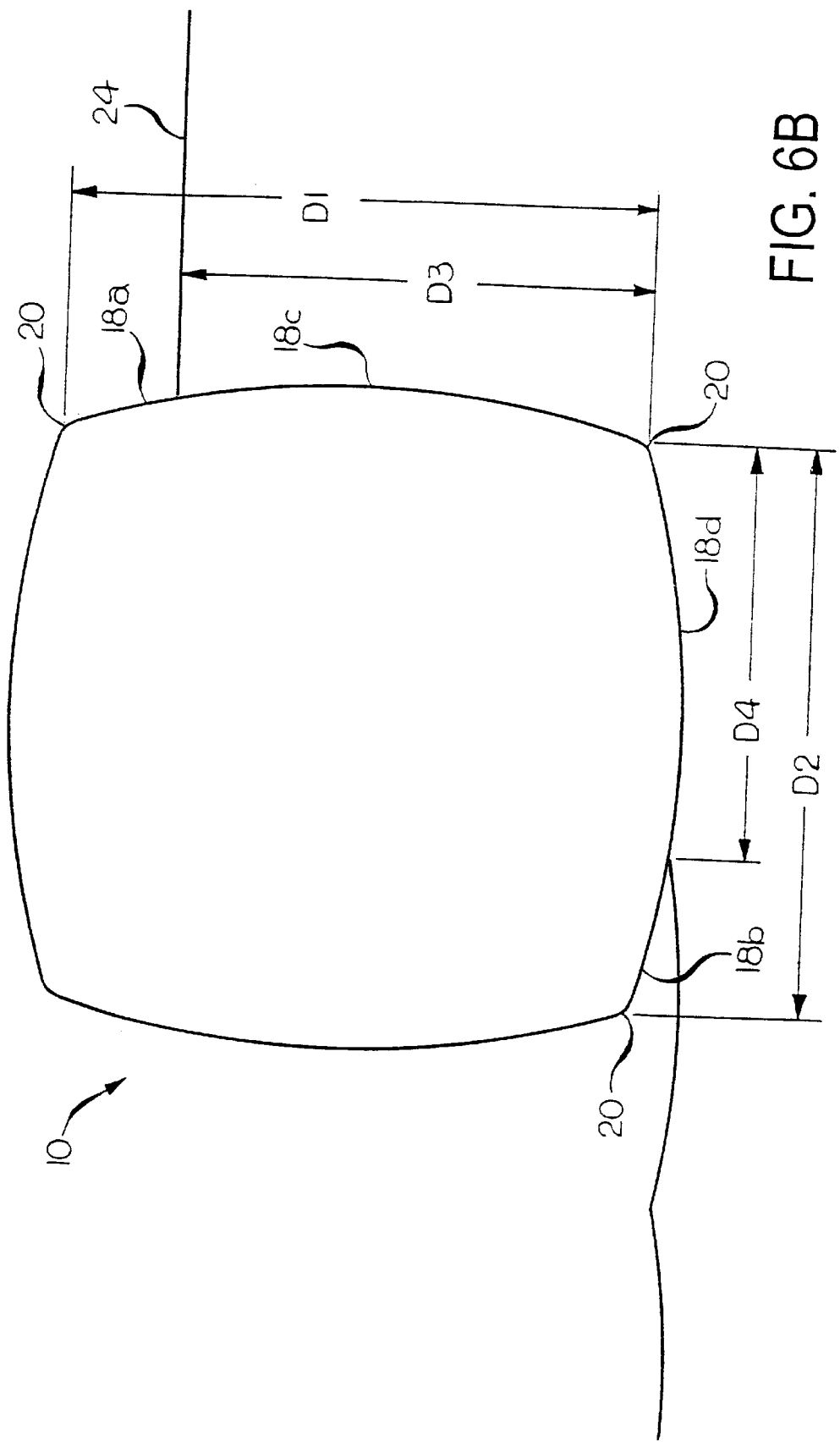

CUTTING INSERT AND METHOD OF MAKING THE SAME

FIELD OF THE INVENTION

The present invention pertains to a cutting insert to be used in cutting tools during machining operations. More particularly, the present invention relates to an insert having a convex wiper cutting edge defined between two surfaces wherein one of the surfaces is a clearance face having a positive clearance angle.

BACKGROUND OF THE INVENTION

It is well known to provide cutting inserts with wiper cutting edges by creating a straight edge or facet on the insert cutting edge. This facet is located after the major cutting edge and creates an improved surface finish by reducing the magnitude of the high points on the machined surface.

When creating a straight edge or facet on the insert cutting edge, the width of the facet must be greater than the advance per revolution to allow the cutting edges to overlap. Moreover, the spindle must be tilted at a critical angle because excessive spindle tilt causes the insert to dig into the work surface due to the sharp ends on the insert. Thus, this configuration does not allow for the rotational angular tolerance of the insert when mounted in the insert pocket.

This design has been improved upon by grinding the side surface of the facet so that it is radiused, thereby creating a radiused wiper cutting edge. The ground radius allows for the angular tolerance without having a detrimental effect on the resulting surface finish by insuring that the ends of the cutting edge do not contact and scratch the work surface.

Instead of grinding the side surface of the facet, the radius on the wiper cutting edge can be formed by grinding the top, chip breaking surface of the insert. An example of such an insert is the MICRO MILL insert available from Ingersoll as Part No. YCE434-01. However, this type of insert requires a negative axial rake to produce the convex wiper cutting edge. In addition, the grinding of the top surface and the accuracy with which it is ground create additional manufacturing operations and costs. Thus, it would be desirable to provide an insert having a generated convex cutting edge (wiper), or a convex cutting edge (wiper) that is formed without grinding.

SUMMARY OF THE INVENTION

The present invention is directed towards a cutting insert comprising a rake face including a convex portion, a flank face including a clearance face having a positive clearance angle, a cutting edge formed at an intersection between the rake face and the flank face, and a convex cutting edge formed on the cutting edge.

The invention is also directed towards a method for forming a cutting insert. The method comprises the steps of placing a powdered material into a die and pressing the powdered material in the die to achieve a form having a convex rake face and at least one flank face including a clearance face having a positive clearance angle. Next, the form is removed from the die and sintered.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 6B is an enlarged diagrammatic representation of the working cutting edges of the insert of FIG. 6A.

DETAILED DESCRIPTION OF THE INVENTION

Figure 1:
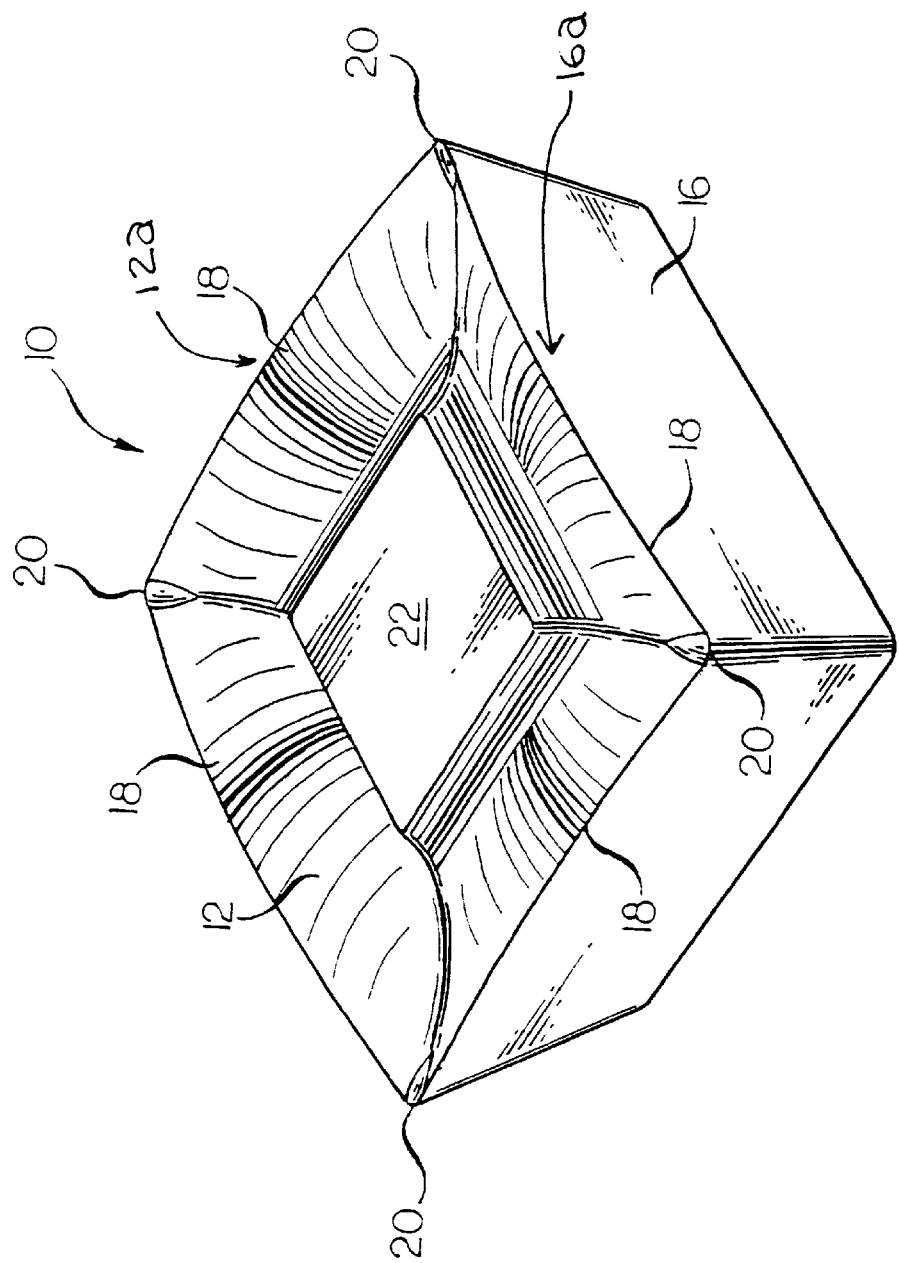
FIG. 1 is a perspective view of a cutting insert having a substantially square cutting geometry and a convex cutting edge in accordance with the invention.
Figure 2:
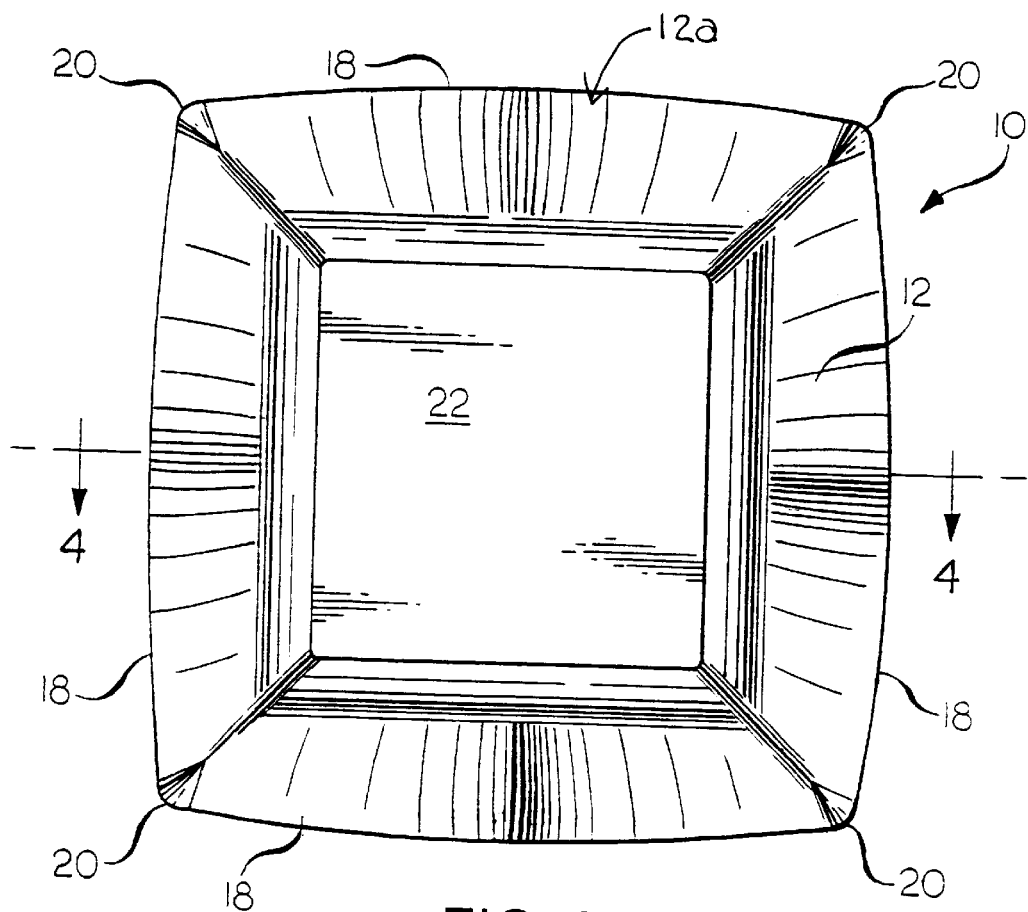
FIG. 2 is a top plan view of the cutting insert of FIG. 1.
Figure 3:
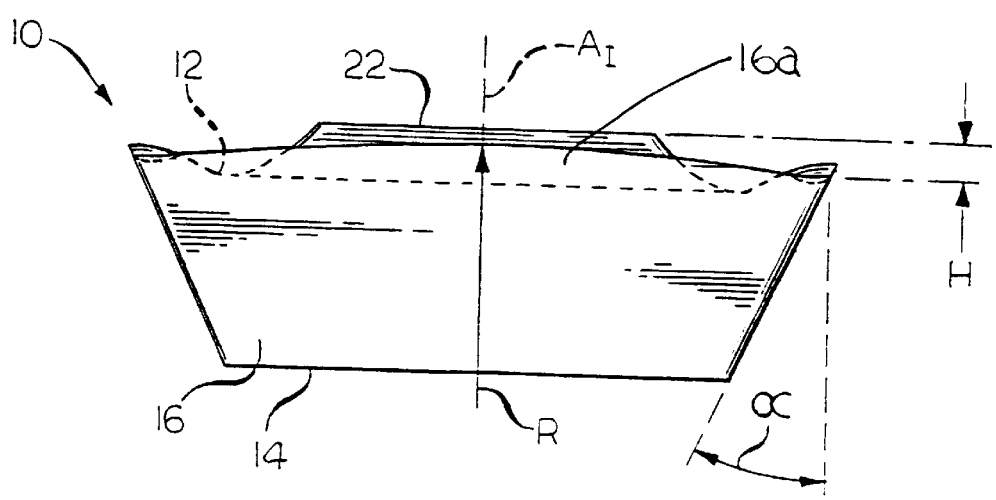
FIG. 3 is a side elevational view of the cutting insert of FIG. 1.

Referring to FIGS. 1–3, there is shown an insert 10. The insert 10 includes a rake face 12, a seating surface 14 and a plurality of flank faces 16 extending between the rake face and the seating surface. At least one cutting edge 18 is defined by the intersection of at least one of the rake faces 12 and at least one of the flank faces 16.

As shown, the insert 10 includes four cutting edges 18 that are formed at the intersection between the rake face 12 and four flank faces 16. Thus, the insert 10, may have a substantially square cutting geometry. Each of the cutting edges can be indexed into a working or active position and effectively utilized in a cutting tool of a type well known in the art.

The at least one rake face 12 includes a convex portion 12a and the at least one flank face 16 includes a substantially flat clearance face 16a having a positive clearance angle adjacent to the at least one cutting edge 18. The rake face 12, or a portion thereof, preferably includes a chip breaking surface of a type well known in the art. The intersection of the convex portion and the substantially flat clearance face defines a portion the at least one cutting edge of a convex shape. The convex shape portion of the cutting edge may be useful as a wiper to produce an improved surface finish on a workpiece 24.

The insert 10 may further include four corner radii or chamfered corners 20 at the intersection between two adjacent cutting edges 18. It will be appreciated that chamfered corners 20 produce a finer surface finish on the workpiece 24 than an insert that has a sharp or flat corner.

The rake face and seating surface 12, 14 of the insert 10 may be formed with a centrally disposed, substantially planar island 22 which projects above or below the cutting edges 18 by a height, H, which for example, may be in the range of about 0.05 mm to about 0.40 mm. The island 22 may be used as a clamping surface when the insert 10 is positioned in the cutting tool. In the alternative, it will be appreciated that the insert 10 can be provided with a hole, such as the hole 82 shown, for fixing the insert 70 in the cutting tool.

As best shown in FIG. 3, the clearance faces 16a are preferably not perpendicular to the upper and lower surfaces 12, 14, but instead are inclined at a positive clearance angle, $\alpha$, (that is, the angle formed between each clearance face 16a and a plane oriented parallel to the center axis, $A_I$, of the insert 10) greater than 0 degrees so that that the clearance faces 16a converge or taper inwardly from the rake face 12 to the seating surface 14.

Figure 4:
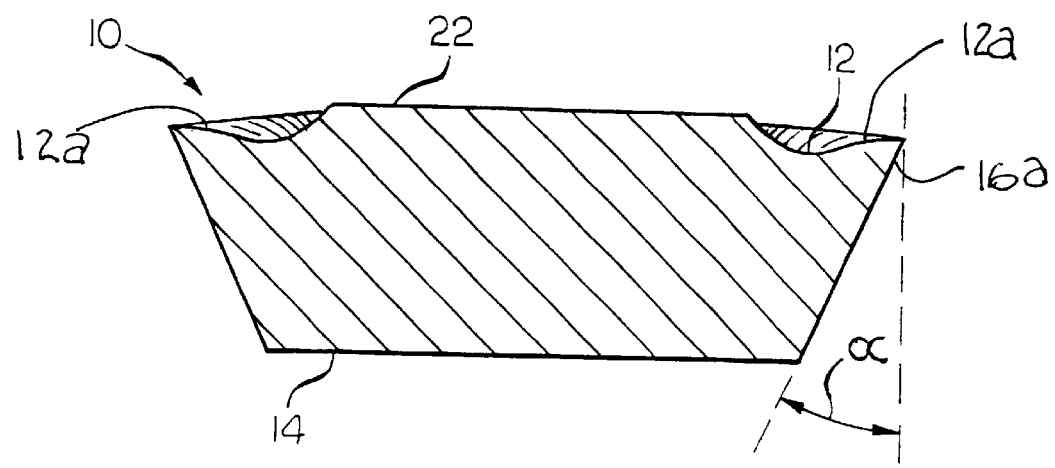
FIG. 4 is a cross section view of the cutting insert taken along line 4—4 of FIG. 2.
Figure 5:
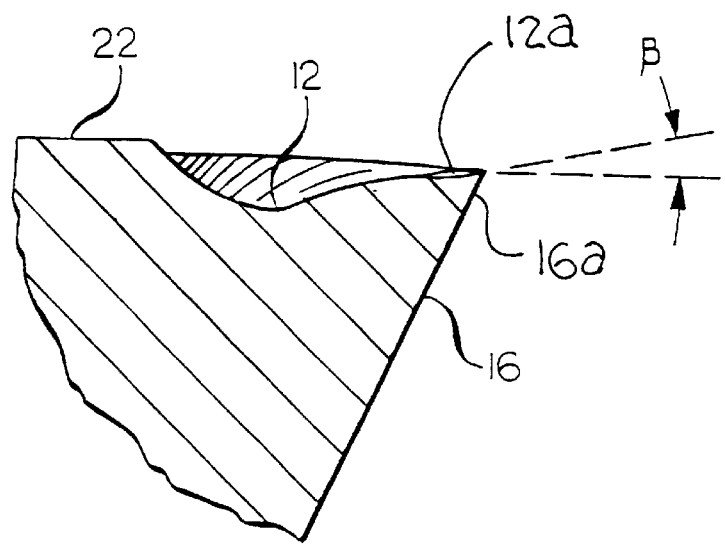
FIG. 5 is an enlarged view of the clearance face and chip breaking surface of the insert of FIG. 1.

As seen in FIGS. 4 and 5, the rake face 12 includes a convex portion 12a which slopes away from the cutting edge 18 at a positive or negative angle or 0 degree angle, $\beta$. The convex portion 12a may, for example have a topography of a conical, cylindrical, elliptical, or spherical shape. The slope of the convex portion 12a may gradually increase or decrease as the rake face 12 approaches the island 22.

During a machining operation, certain cutting edges may be used. These cutting edges are commonly referred as "working cutting edges". The insert 10 shown in FIGS. 6A and 6B has two working cutting edges; a working major cutting edge 18a and a working minor cutting edge 18b.

Figure 6A:
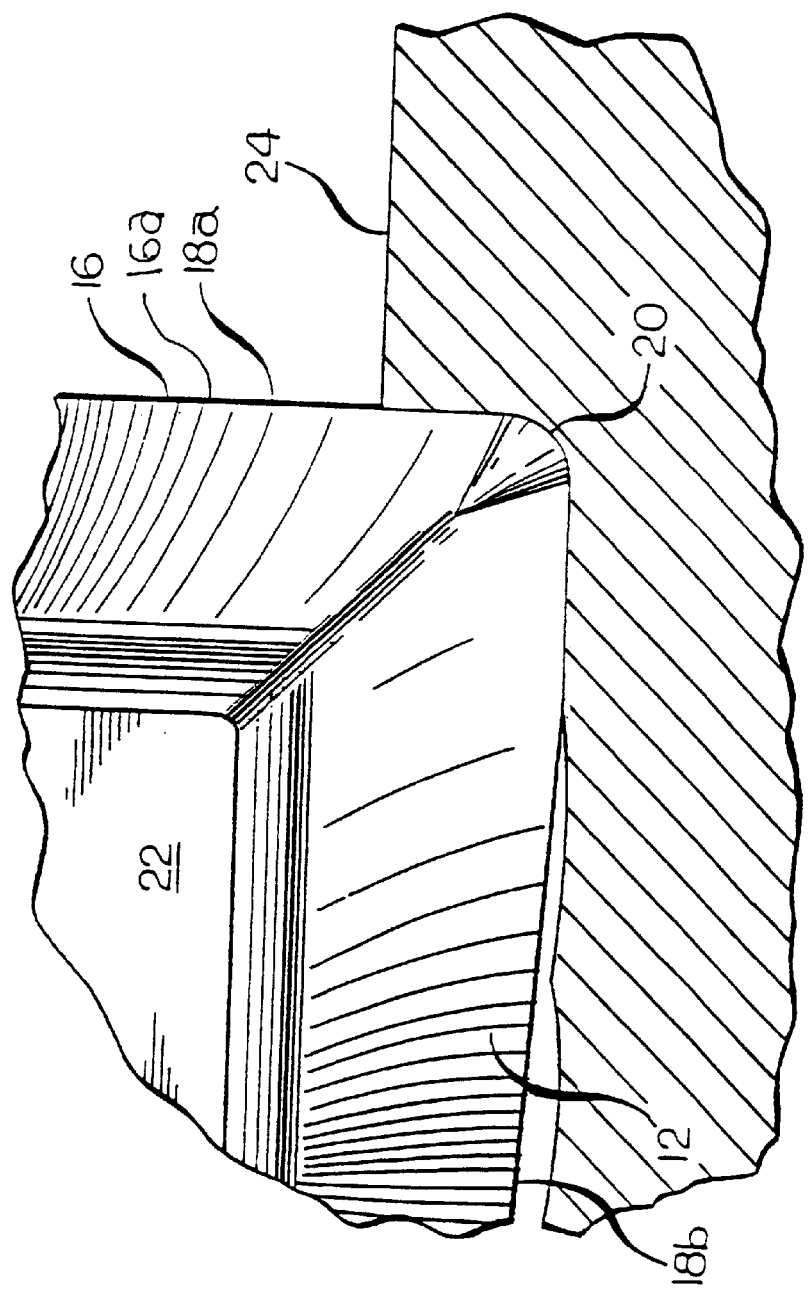
FIG. 6A is an enlarged view of the insert of FIG. 1 performing a milling or turning operation on a workpiece.
Figure 7:
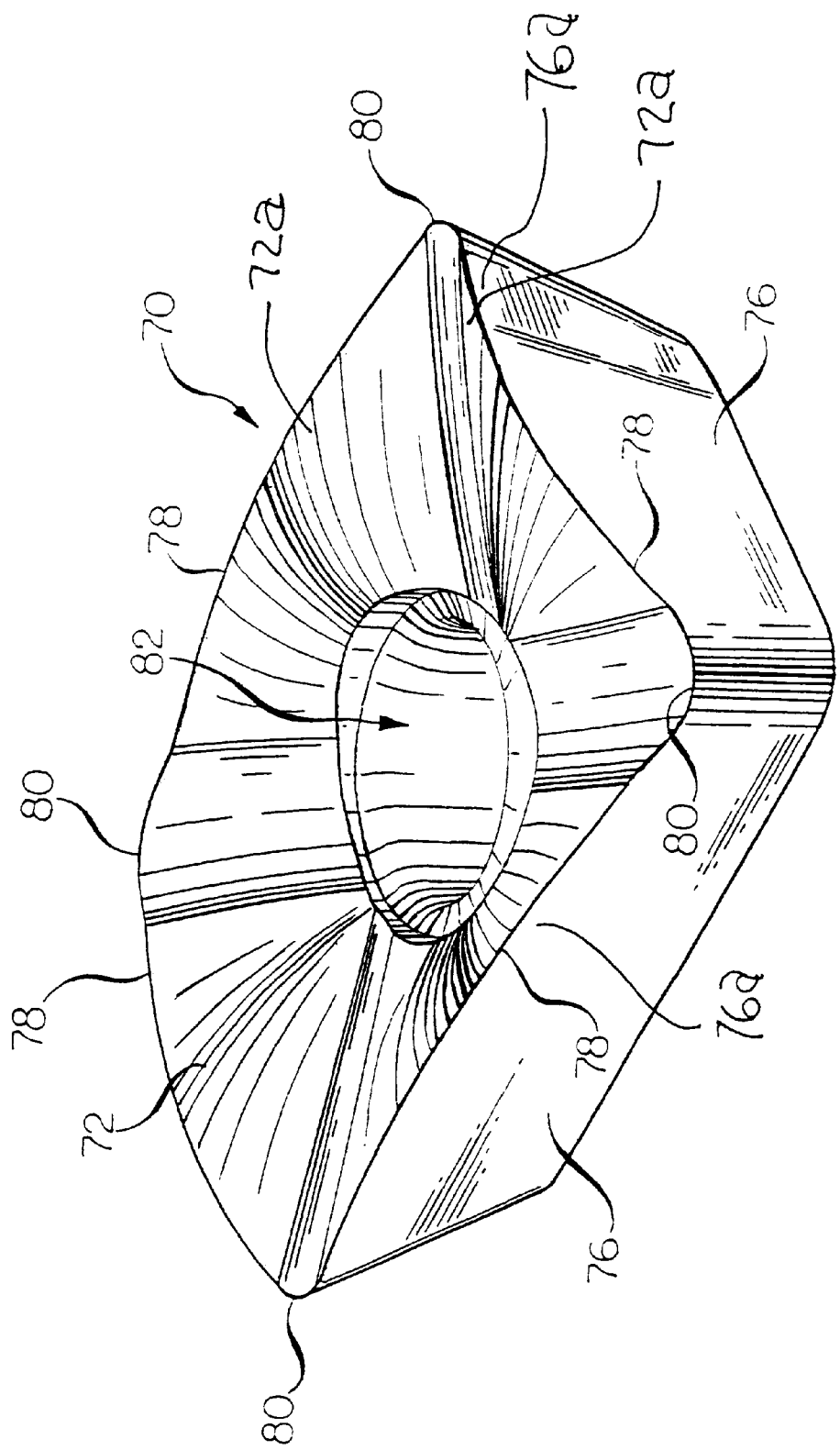
FIG. 7 is a perspective view of a cutting insert having a substantially parallelogram cutting geometry and a convex cutting edge.
Figure 8:
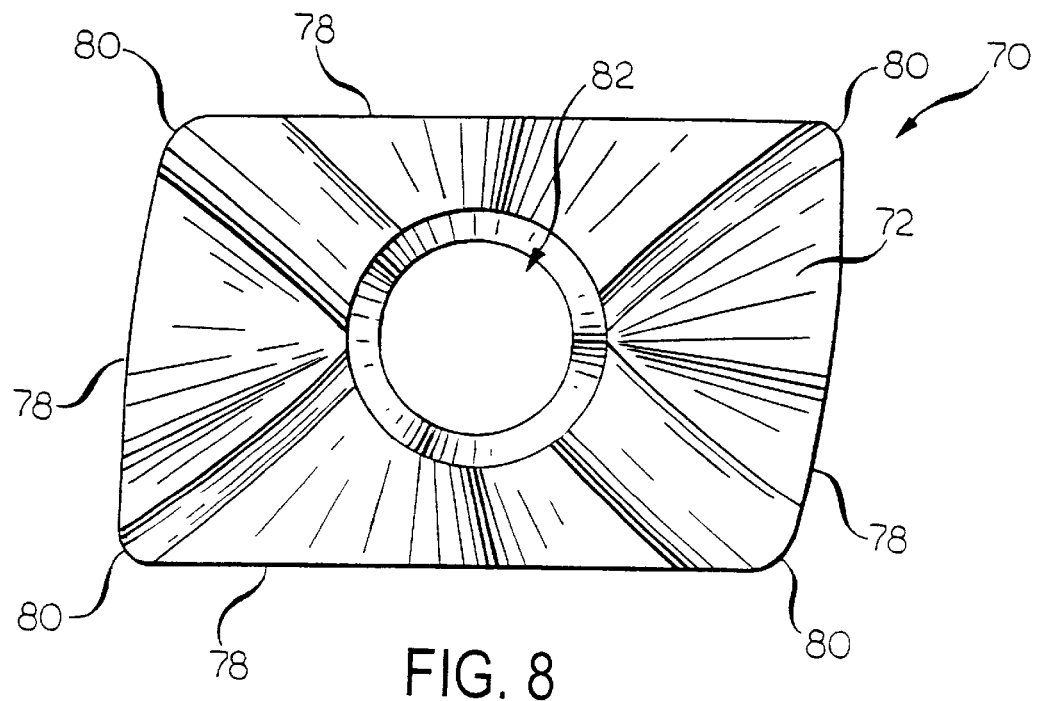
FIG. 8 is a top plan view of the cutting insert of FIG. 7.

The working major cutting edge 18a extends a distance $D_1$ between two of the chamfered corners 20. The working minor cutting edge 18b extends a distance $D_2$ from the intersection of the working major and minor cutting edges 18a, 18b to another chamfered corner 20. Portions of the working major and minor cutting edges 18a, 18b that actually engage the workpiece 24 may be defined as "active cutting edges". For example, as shown in FIGS. 6A and 6B, an active major cutting edge may extend a distance $D_3$ from the intersection of the working major and minor cutting edges 18a, 18b and away from the working minor cutting edge 18b. An active minor cutting edge may extend a distance $D_4$ from the intersection of the working major and minor cutting edges 18a, 18b and away from the working major cutting edge 18a.

Referring to FIGS. 6A and 6B, the working major and/or minor cutting edges 18a, 18b may further include a convex cutting edges 18c and 18d. The convex cutting edges 18c and 18d may be defined by a portion of the working major and/or minor cutting edges 18a, 18b that produces a transient and/or machined surface. The convex cutting edge 18c and 18d is defined by the intersection of the convex portion 12a of the rake face 12 and the substantially flat clearance face 16a. The convex cutting edges 18c, 18d have a convex portion 12a generally defined by a radius, R, as shown in FIG. 3.

It will be appreciated that the convex cutting edges 18c, 18d of the invention allow the insert 10 to produce an improved surface finish on the workpiece 24. It will be further appreciated that the principles of the invention of forming a convex cutting edge (wiper) by the intersection of a convex portion of the rake surface and a substantially flat clearance face of the flank surface can be applied to inserts having any desired cutting geometry and any desired number of cutting edges.

For example, FIGS. 7–10 illustrate the principles of the invention being applied to another insert 70 having a substantially parallelogram shaped geometry. The insert 70 has a rake face 72, a seating surface 74, and flank faces 76 including four substantially flat clearance faces 76a. The rake face 72, or a portion thereof, may include a chip breaking surface.

The insert 70 preferably has four cutting edges 78 that are formed at the intersection between the rake face 72 and the four flank faces 76. In addition, the insert 70 may include four corner radii or chamfered corners 80 formed at the intersection between two adjacent cutting edges 78. Each of the cutting edges 78 can be indexed into an active position and effectively utilized in a cutting tool of a type well known in the art.

The rake face 72 and seating surface 74 of the insert 70 can be formed with a centrally disposed island, similar to the insert 10 described above. The island may project above or below the cutting edges 78. The island may be used as a clamping surface when the insert 70 is positioned in the cutting tool as well known in the art. Moreover, in an alternate embodiment, the island can be provided with a hole 82 for fixing the insert 70 in the cutting tool.

Figure 11A:
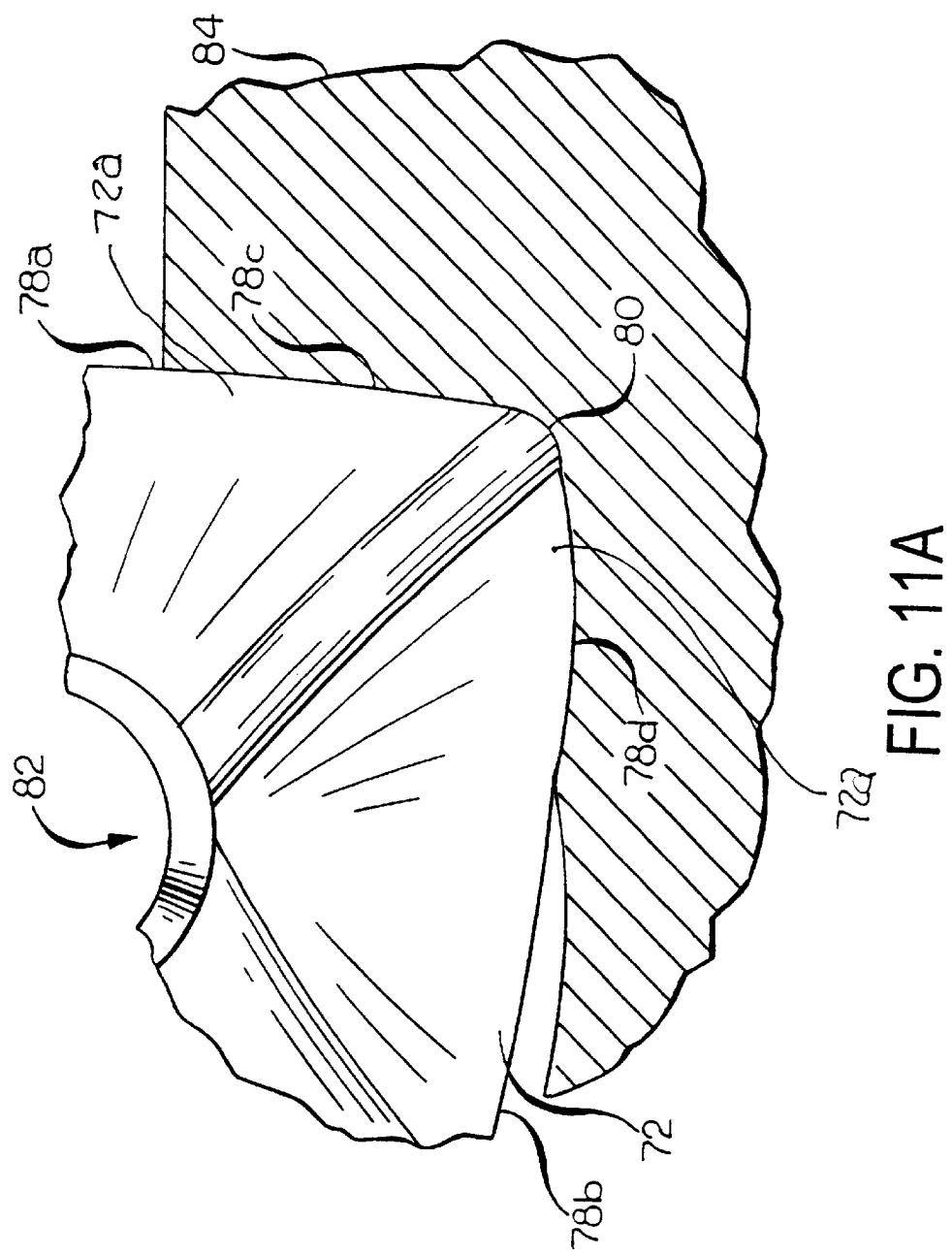
FIG. 11A is an enlarged view of the insert of FIG. 7 performing a milling or turning operation on a workpiece.
Figure 11B:
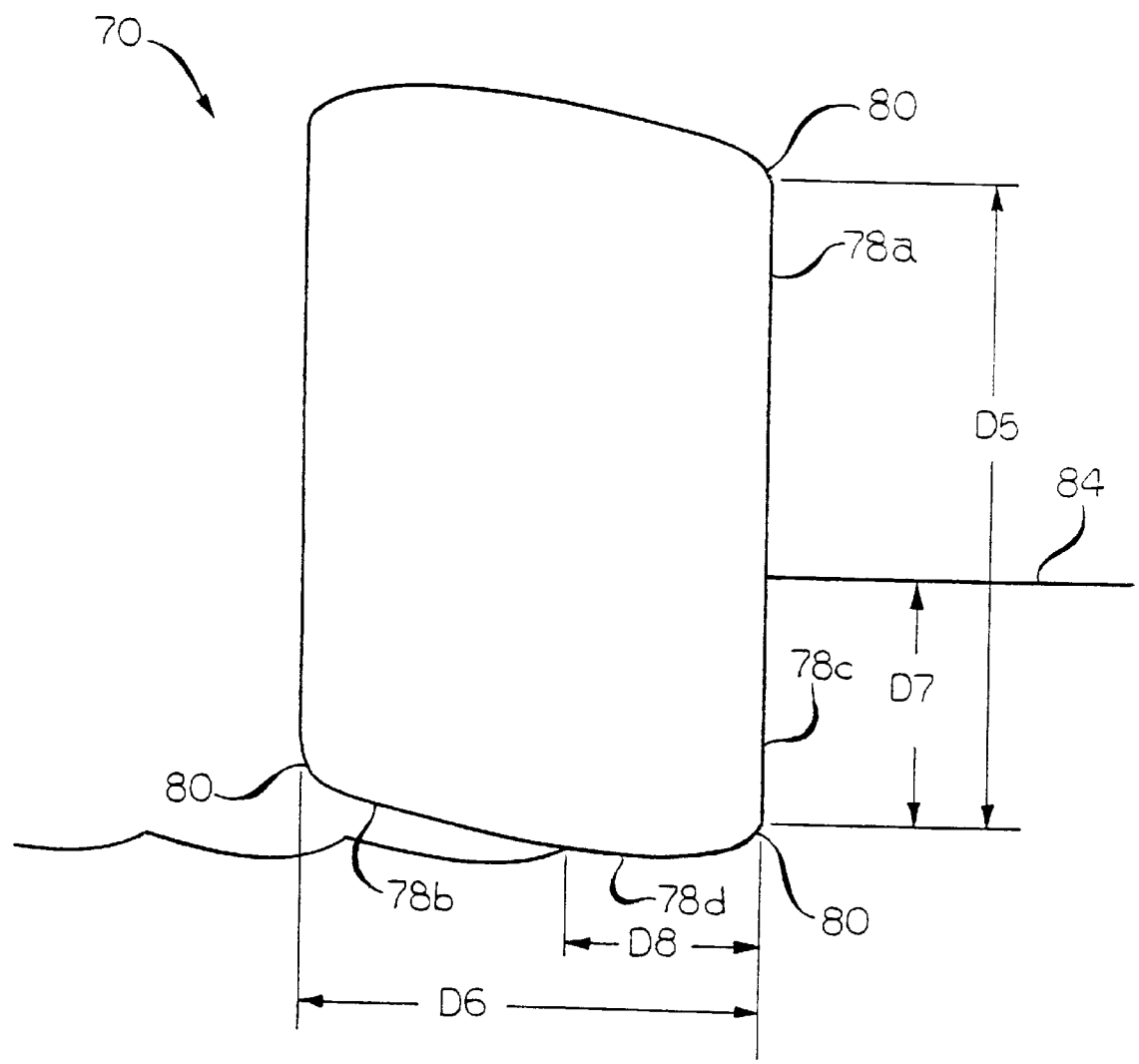
FIG. 11B is an enlarged diagrammatic representation of the working cutting edges of the insert of FIG. 11A.

During a machining operation, the insert 70 may include a working major cutting edge 78a and a working minor cutting edge 78b, similar to those shown in FIGS. 11A and 11B. The working major cutting edge 78a may extend a distance $D_5$ between two of the chamfered corners 80. The working minor cutting edge 78b extends a distance $D_6$ from the intersection of the working major and minor cutting edges 78a, 78b to another chamfered corner 80.

Portions of the working major and minor cutting edges 78a, 78b that actually engage the workpiece 84 may be defined as "active cutting edges". An active major cutting edge may extend a distance $D_7$ from the intersection of the working major and minor cutting edges 78a, 78b and away from the working minor cutting edge 78b. An active minor cutting edge may extend a distance $D_8$ from the intersection of the working major and minor cutting edges 78a, 78b and away from the working major cutting edge 78a.

A convex cutting edge may be defined by a portion of the working major and/or minor cutting edges 78a, 78b that produces a transient and/or machined surface. The insert shown in FIGS. 11A and 11B has a convex cutting edges 78c and 78d that are respectively defined by the active major and minor cutting edges.

Figure 9:
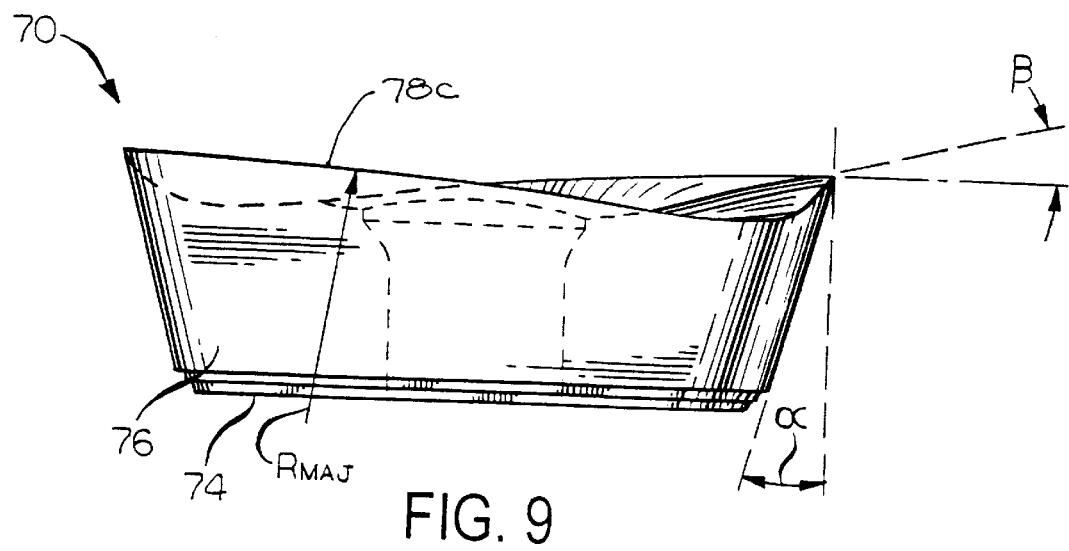
FIG. 9 is a side elevational view of the cutting insert of FIG. 7.
Figure 10:
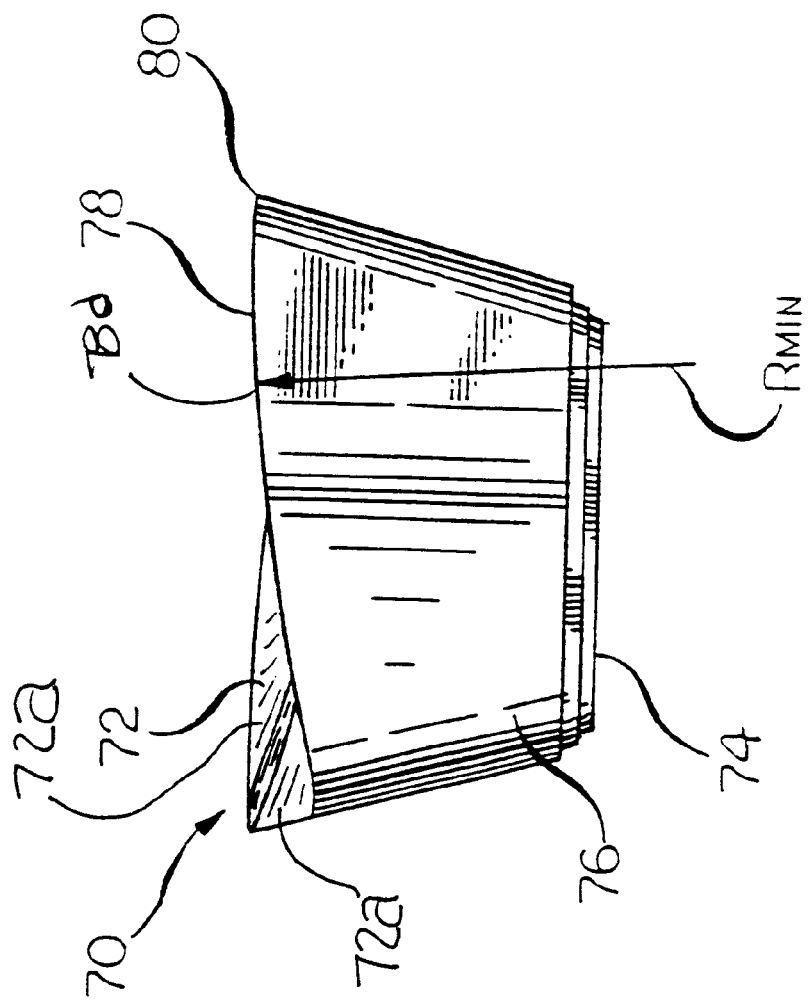
FIG. 10 is an end view in elevation of the cutting insert of FIG. 7.

The convex cutting edges 78c and 78d are defined by the convex portion 72a of the rake face 72 and the substantially flat clearance face 76a. The convex cutting edge 78c has a convex portion defined by a radius, $R_{MAJ}$, as shown in FIG. 9. The convex cutting edge 78d has a convex portion 72a defined by a radius, $R_{MIN}$, as shown in FIG. 10. The convex cutting edges 78c, 78d of the invention allow the insert 70 to produce an improved surface finish on the workpiece 84.

Figure 12:
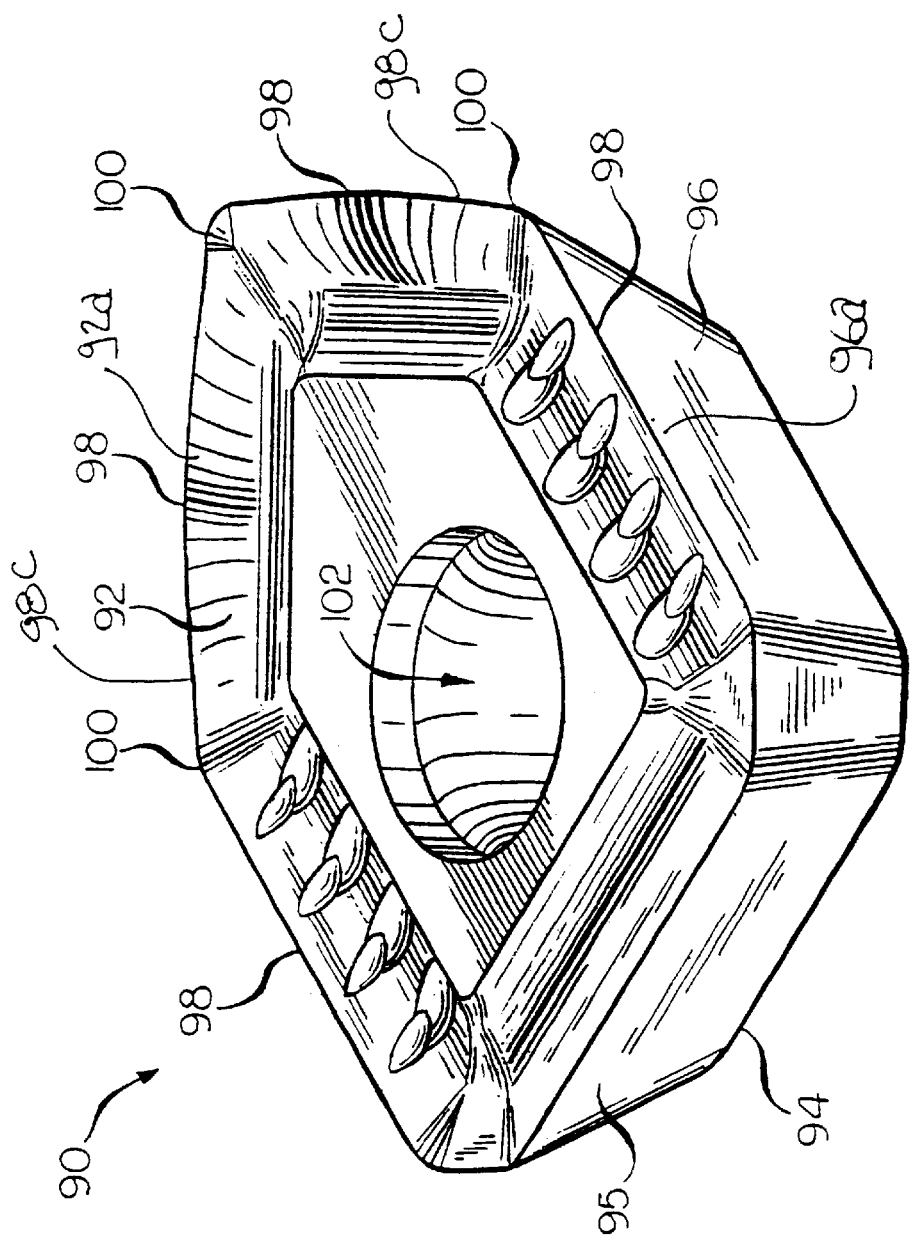
FIG. 12 is a perspective view of a cutting insert having a substantially pentagonal cutting geometry and a convex cutting edge.
Figure 13:
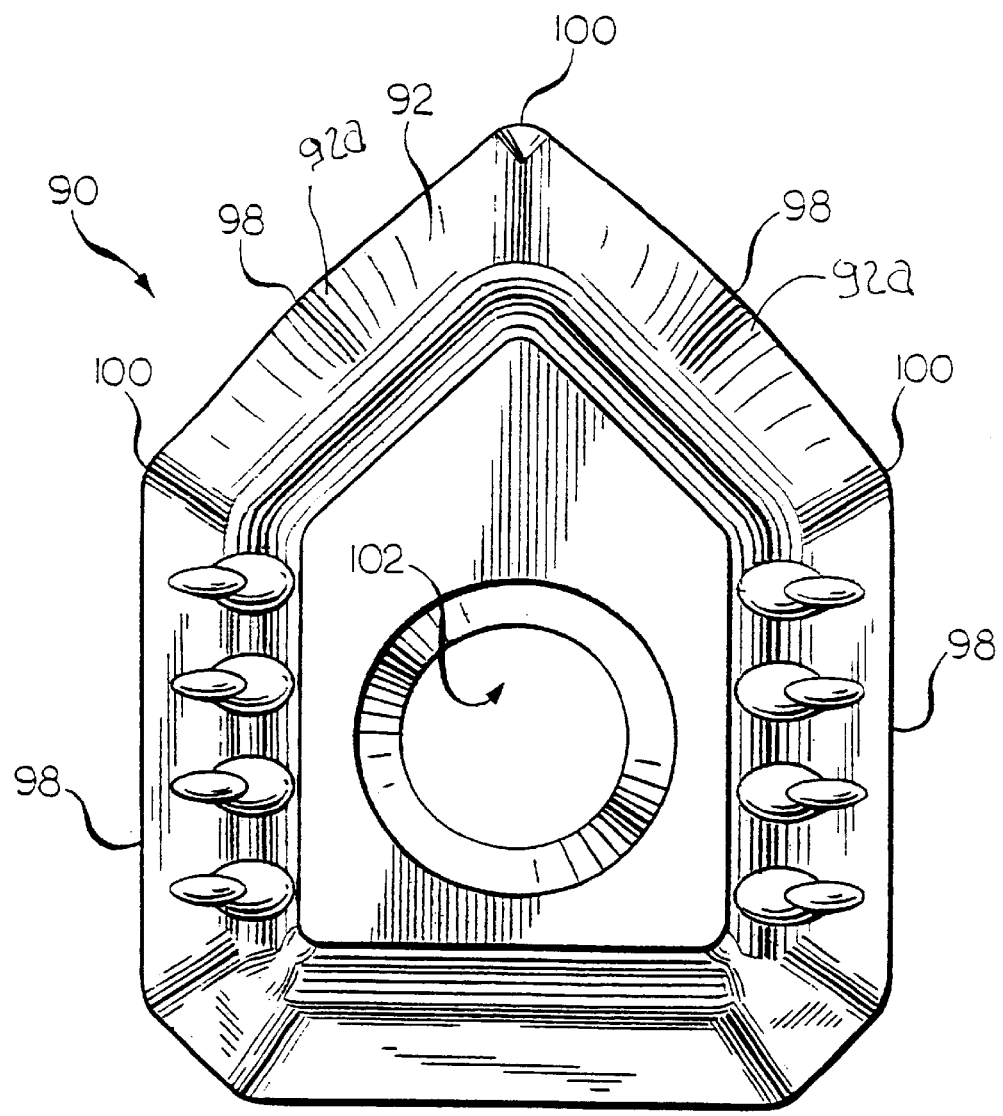
FIG. 13 is a top plan view of the cutting insert of FIG. 12.

FIGS. 12–13 illustrate the principles of the invention being applied to an insert 90 having a substantially pentagonal shaped cutting geometry. The insert 90 has a rake face 92, a seating surface 94, an end surface 95, and four flank faces 96 including four substantially flat clearance faces 96a. The rake face 92, or a portion thereof, may define a chip breaking surface. The end surface 95 is provided for fixing the insert 90 in a cutting tool of a type well known in the art.

The insert 90 preferably has four cutting edges 98 that are formed at the intersection between the rake face 92 and the four flank faces 96. In addition, the insert 90 may include corner radii or chamfered corners 100 formed at the intersection between two adjacent cutting edges 98. The cutting edges 98 are provided for right and left-handed operations.

The rake face 92 and the seating surface 94 of the insert 90 can be formed with a centrally disposed island, similar to the inserts 10 and 70 above. The island may project above or below the cutting edges 98. The island may be used as a clamping surface when the insert 90 is positioned in the cutting tool. Moreover, the insert 90 can be provided with a hole, such as the hole 102 shown, for fixing the insert 90 in the cutting tool.

Figure 14:
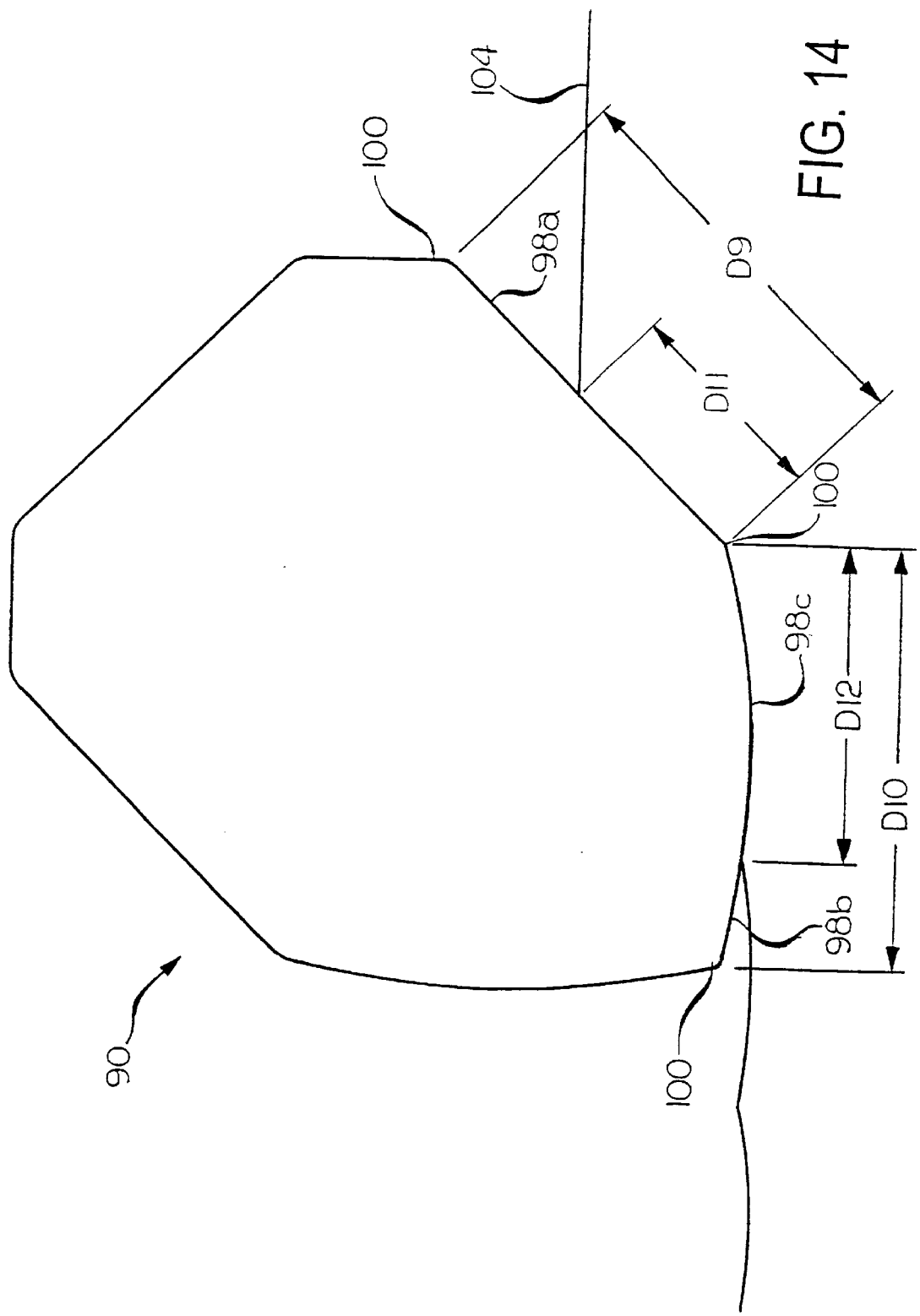
FIG. 14 is an enlarged diagrammatic representation of the working cutting edges of the insert of FIG. 12 during a milling or turning operation on a workpiece.

During a machining operation, the insert 90 may include a working major cutting edge 98a and a working minor cutting edge 98b, similar to those shown in FIG. 14. The working major cutting edge 98a may extend a distance $D_9$ between two of the chamfered corners 100. The working minor cutting edge 98b may extend a distance $D_{10}$ from the intersection of the working major and minor cutting edges 98a, 98b to another chamfered corner 100. An active major cutting edge may extend a distance $D_{11}$ from the intersection of the working major and minor cutting edges 98a, 98b and away from the working minor cutting edge 98b. An active minor cutting edge may extend a distance $D_{12}$ from the intersection of the working major and minor cutting edges 98a, 98b and away from the working major cutting edge 98a. A convex cutting edge may be defined by a portion of the working major and/or minor cutting edges 98a, 98b that produces a transient and/or machined surface. The insert shown in FIG. 14 has a convex cutting edge 98c defined by the active minor cutting edge.

The convex cutting edge 98c is defined by the intersection of the convex portion 92a of the rake face 92 and the substantially flat clearance face 96a. The convex cutting edge 98c of the invention allows the insert 90 to produce an improved surface finish on the workpiece 104.

Figure 15:
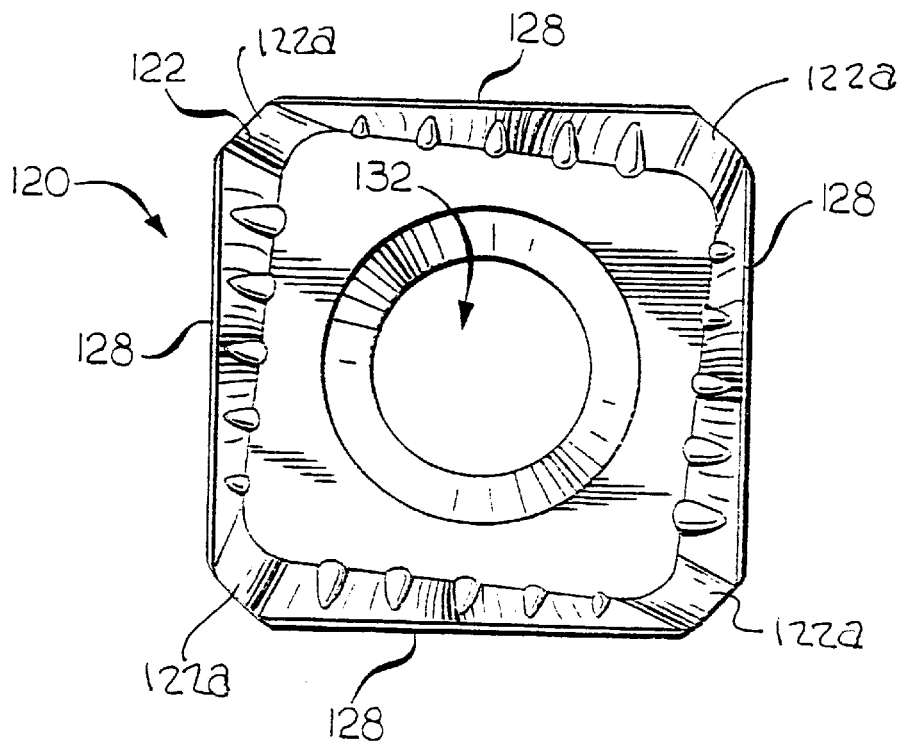
FIG. 15 is a top plan view of a cutting insert having a substantially octagonal cutting geometry and a convex cutting edge.
Figure 16:
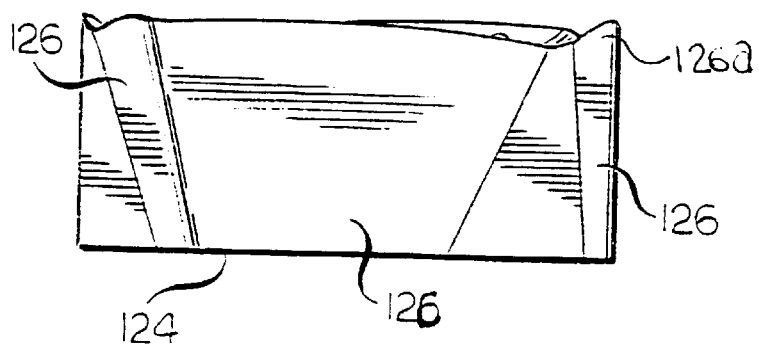
FIG. 16 is a side elevational view of the cutting insert of FIG. 15.

FIGS. 15–16 illustrate the principles of the invention being applied to yet another insert 120. Similar to the insert 10 above, this insert 120 has a substantially square cutting geometry. The insert 120 has a rake face 122, a seating surface 124, eight flank faces 126 including four clearance faces 126a. The rake face 122, or a portion thereof, may include a chip breaking surface. Although only three flank faces 126 are shown in FIG. 16, the opposite side of the insert 120 has identical flank faces. The clearance faces 126a are preferably substantially flat. The insert 120 preferably has eight cutting edges 128 that are formed at the intersection between the rake face 122 and the eight flank faces 126.

The rake face 122 and seating surface 124 of the insert 120 can be formed with a centrally disposed island, similar to the inserts 10, 70, and 90 above. The island may be used as a clamping surface when the insert 120 is positioned in the cutting tool. Moreover, the insert 120 can be provided with a hole, such as the hole 132 shown, for fixing the insert 120 in the cutting tool.

Figure 17:
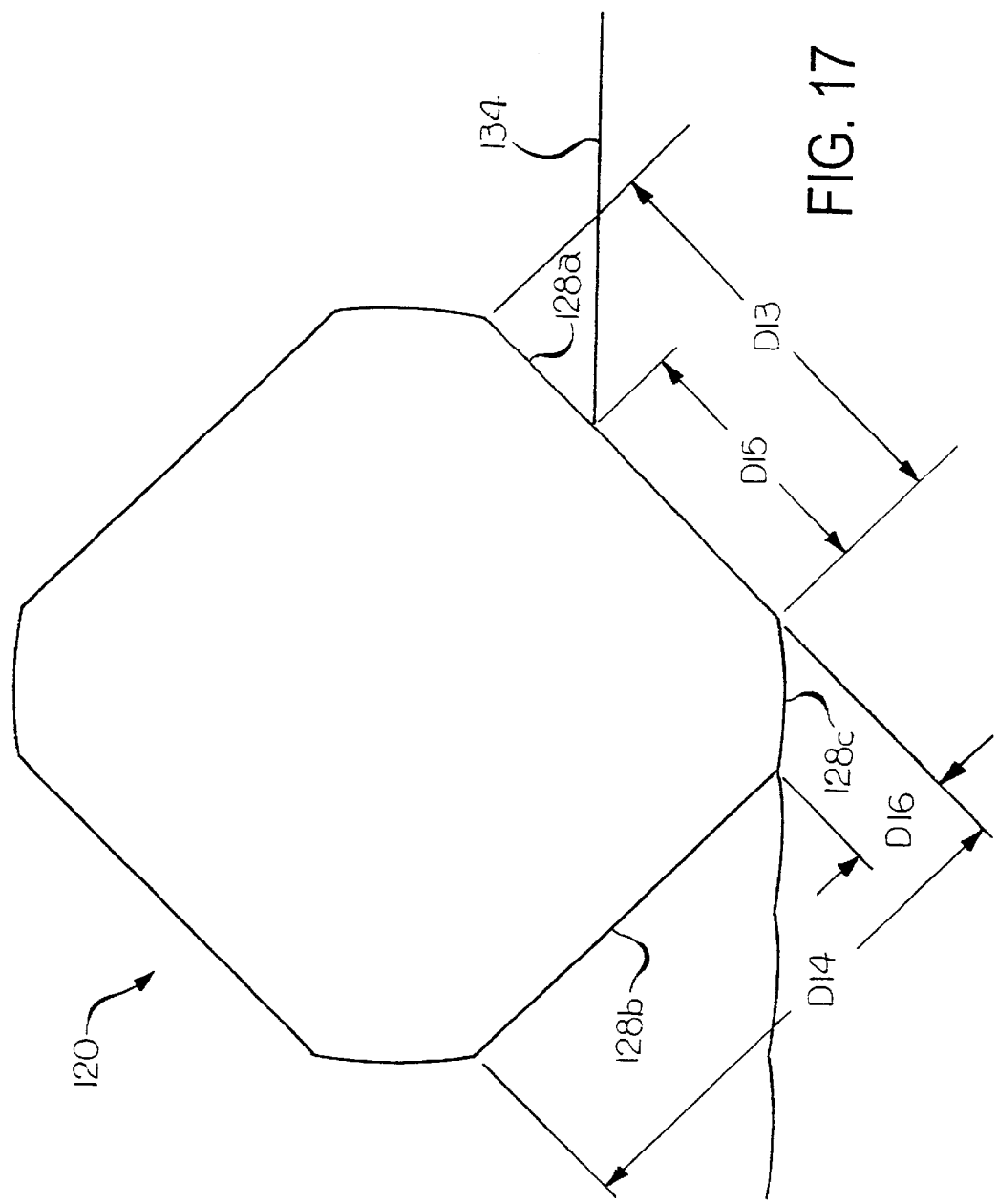
FIG. 17 is an enlarged diagrammatic representation of the working cutting edges of the insert of FIG. 15 during a milling or turning operation on a workpiece.

During a machining operation, the insert 120 may include a working major cutting edge 128a and a working minor cutting edge 128b, similar to those shown in FIG. 17. The working major cutting edge 128a may extend a distance $D_{13}$ from and away from the working minor cutting edge 128b. The working minor cutting edge 128b extends a distance $D_{14}$ from and away from the working major cutting edge 128a. An active major cutting edge may extend a distance $D_{15}$ along the working major cutting edge 128a. An active minor cutting edge may extend a distance $D_{16}$ along the working minor cutting edge 128b. A convex cutting edge 128c may be defined by the active minor cutting edge.

The convex cutting edge 128c is defined by the intersection of the convex portion 122a of the rake face 122 and the substantially flat clearance face 126a. The convex cutting edge 128c of the invention allows the insert 120 to produce an improved surface finish on the workpiece 134.

Figure 18:
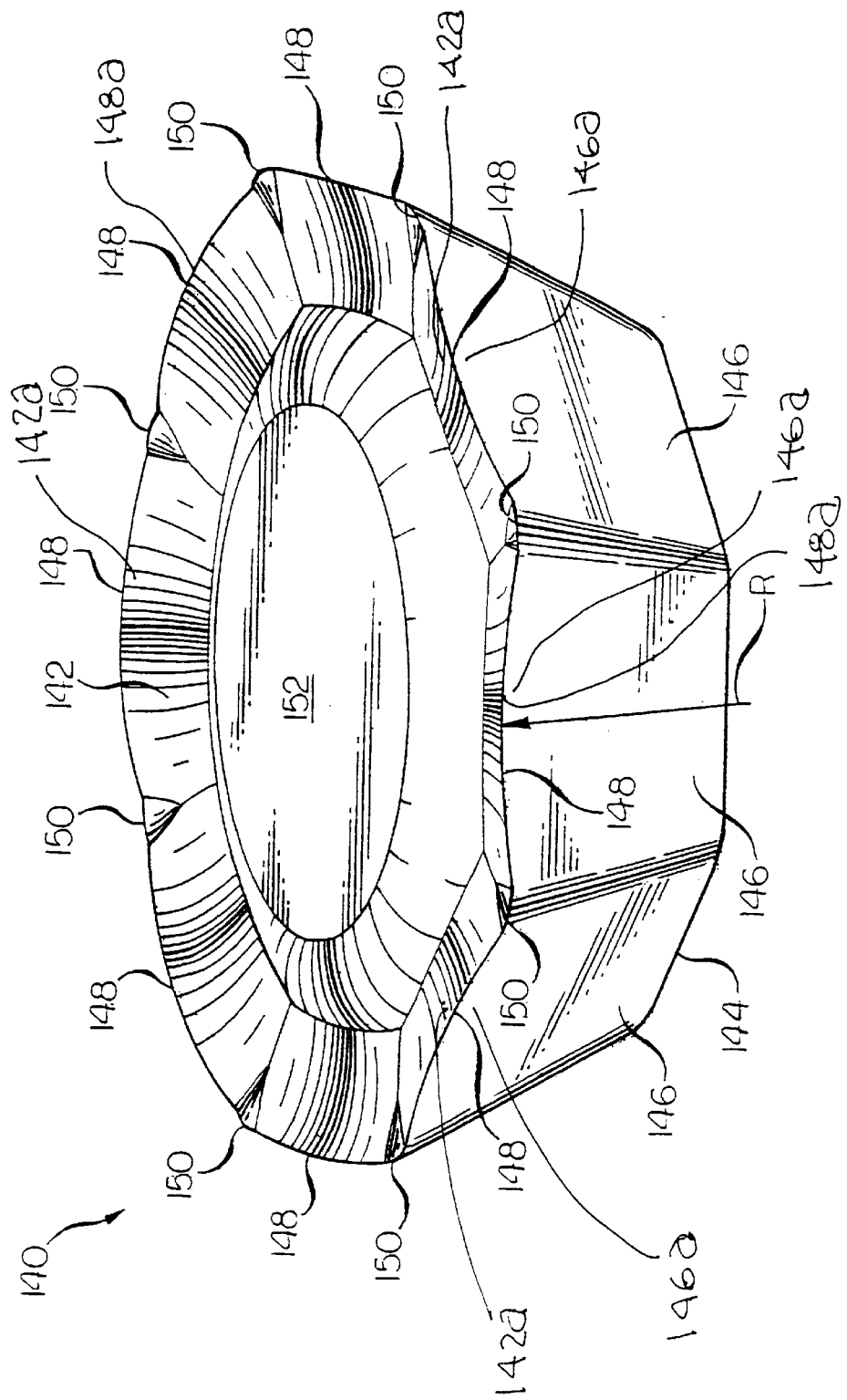
FIG. 18 is a perspective view of a cutting insert having another octagonal cutting geometry and a convex cutting edge.

FIG. 18 illustrates the principles of the invention being applied to still another insert 140. The insert 140 may include a rake face 142, a seating surface 144, and flank faces 146 including clearance faces 146. The rake face 142, or a portion thereof, preferably defines a chip breaking surface. The clearance faces 146 are preferably substantially flat. The insert 140 may include eight cutting edges 148 that are formed at the intersection between the rake face 142 and the eight flank faces 146. Thus, the insert 10 may have a substantially octagonal cutting geometry. Each of the cutting edges 148 can be indexed into an working or active position and effectively utilized in a cutting tool of a type well known in the art.

The insert 140 may further include eight corner radii or chamfered corners 150 at the intersection between two adjacent cutting edges 148.

The rake face 142 and seating surface 144 of the insert 140 may be formed with a centrally disposed, substantially planar island 152. The island 152 may be used as a clamping surface when the insert 140 is positioned in the cutting tool.

The rake face 142 may have a convex portion 142a of a conical, cylindrical, elliptical, or spherical topography. Each clearance face 146a preferably has a positive clearance angle. A convex cutting edge 148a may be defined by a portion of each cutting edge 148.

It should be understood that the radius of the convex portion of the convex cutting edge may vary. In fact, the radius may be so great that the convex portion of the convex cutting edge may, for example, from a cursory inspection, appear to be straight. There are no particular ranges set for the radii, R, $R_{MIN}$, $R_{MAJ}$, set forth above. Values for the radii are based on such variables as the axial and radial rake of the insert, the rotational pocket tolerance of the insert, the feed of the workpiece, the clearance angle on the insert, the chip breaker land angle, and the cutting edge of the insert. This list of variables is provided for illustrative purposes and is not intended to be exhaustive. The radii are intended to be calculated independently of one another.

It should also be understood that principles of the invention are not limited by the cutting geometry of the inserts shown, and that the principles of the invention can be practiced with inserts having any cutting geometry. For example, although not shown, any of the cutting edges may be chamfered to form a cutting insert with a land on the cutting edge.

It should be further understood that the entire rake face need not be convex but rather a portion or portions of the rake face may be convex.

It will be appreciated that the convex cutting edges of the present invention can be formed without grinding. For example, the convex portion 12a of the rake face 12 has a topography that can be formed by sintering a convex conical, cylindrical, elliptical, or spherical shape on the rake face 12 of the insert 10. The clearance faces 16a can be formed by pressing or grinding a substantially flat surface to enable the insert 10 to properly seat when positioned in the cutting tool.

An insert according to the present invention can be formed according to the following method steps. First, a powdered material may be placed into a die and pressed in the die to achieve a desired form. Subsequently, the form may be removed and sintered, that is, cured in a furnace. The sintered form may be smaller than the form prior to being sintered. Hence, the size of the die may have to accommodate shrinkage.

The foregoing method may not produce a cutting insert within desired tolerances. Hence, the resultant form or portions thereof may have to be ground to produce a cutting insert within the desired tolerances. It should be understood, however, that the die may be shaped to produce the convex cutting edge and clearance faces having positive clearance angles without grinding the insert.

The patents and publications referred to herein are hereby incorporated by reference. Having described presently preferred embodiments the invention may be otherwise embodied within the scope of the appended claims.

What is claimed is:

1. A cutting insert comprising:
    a rake face, a seating surface and a plurality of flank faces extending between the rake face and the seating surface, at least one cutting edge defined by the intersection of the rake face and at least one of the flank faces;
    wherein the rake face has a positive rake face angle β and includes a convex portion adjacent to the at least one cutting edge and the at least one flank face includes a substantially flat clearance face having a positive clearance angle adjacent to the at least one cutting edge and wherein a portion of the at least one cutting edge is of a convex shape as defined by the intersection of the convex portion and the substantially flat clearance face, and wherein a chamfered corner is provided between all adjacent cutting edges.

2. A cutting insert according to claim 1, wherein the rake face has a topography forming a chip breaking surface.

3. A cutting insert according to claim 2, wherein the clearance face is one of a plurality of clearance faces each having a positive clearance angle, each one of the clearance faces being formed by a flat surface.

4. A cutting insert according to claim 3, wherein a cutting edge is formed at the intersection between the surface having the convex portion and the clearance face, a convex wiper cutting edge being formed on the cutting edge.

5. A cutting insert according to claim 4, wherein the cutting edge is a major cutting edge and a minor cutting edge is formed at an intersection between the surface having the convex portion and a different one of the plurality of clearance faces.

6. A cutting insert according to claim 1, wherein the cutting insert has a substantially square cutting geometry.

7. A cutting insert according to claim 1, wherein the cutting insert has a substantially octagonal cutting geometry.

8. A cutting insert according to claim 1, wherein the cutting insert has a substantially pentagonal cutting geometry.

9. A cutting insert comprising:
    a rake face having a convex portion;
    a plurality of flank faces, including clearance faces, at least one of the clearance faces having a positive clearance angle;
    at least one major cutting edge formed at an intersection between the rake face and one of the plurality of clearance faces;
    at least one minor cutting edge formed at an intersection between the rake face and a different one of the plurality of clearance faces; and
    at least one wiper cutting edge having a convex wiper cutting edge formed on the at least one of the minor cutting edge and optionally, major cutting edge, wherein a chamfered corner is provided between all adjacent cutting edges wherein the rake face has a positive rake face angle β.

10. A cutting insert according to claim 9, wherein the rake face has a chip breaking surface.

11. A cutting insert according to claim 9, wherein the cutting insert has a substantially square cutting geometry.

12. A cutting insert according to claim 9, wherein the cutting insert has a substantially octagonal cutting geometry.

13. A cutting insert according to claim 9, wherein the cutting insert has a substantially pentagonal cutting geometry.

* * * * *